Figure 1:
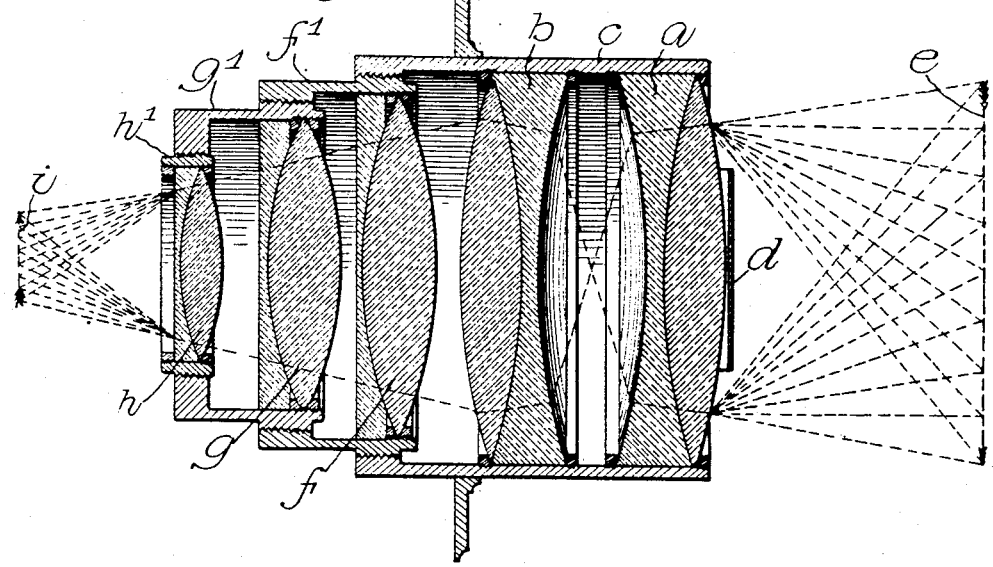

H. B. BYRON.
APPARATUS FOR PRODUCING A ROUND OR RELIEF EFFECT BY PHOTOGRAPHY.
APPLICATION FILED FEB. 16, 1912.

1,154,232. Patented Sept. 21, 1915.

Witnesses:
G. W. Omarus Jr.
R. Burkhardt.

Inventor
Hagar Bolton Byron.
by Bond Adams Pickard Jackson
Attys.

UNITED STATES PATENT OFFICE.

HAGAR BOLTON BYRON, OF CHICAGO, ILLINOIS, ASSIGNOR, BY MESNE ASSIGNMENTS, OF ONE-THIRD TO A. H. ADAMS, ADA E. PICKARD, AND J. L. JACKSON, OF CHICAGO, ILLINOIS.

APPARATUS FOR PRODUCING A ROUND OR RELIEF EFFECT BY PHOTOGRAPHY.

1,154,232.      Specification of Letters Patent.     Patented Sept. 21, 1915.

Application filed February 16, 1912. Serial No. 677,933.

*To all whom it may concern:*

Be it known that I, HAGAR BOLTON BYRON, a citizen of the United States, residing at Chicago, in the county of Cook and State of Illinois, have invented a new and Improved Apparatus for Producing a Round or Relief Effect by Photography, of which the following is a specification, reference being had to the accompanying drawings.

My invention relates to photography, and has for its object to provide an improved apparatus for producing a photographic image of the object photographed, which will present substantially the same relief effect as is presented by the object to the eye in contradistinction to the ordinary flat image heretofore obtained. I accomplish this object as illustrated in the drawings and as hereinafter described.

What I regard as new is set forth in the claims.

Figure 2:
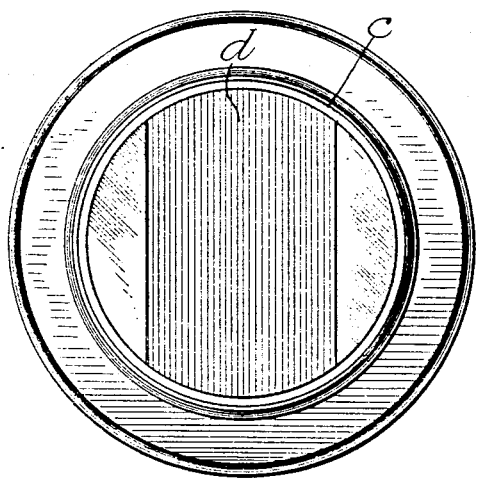
Figure 3:
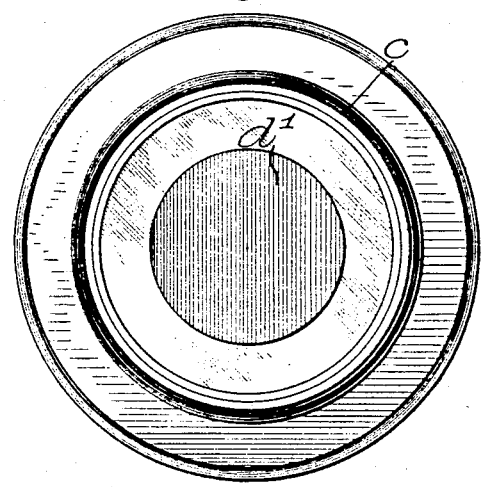

In the accompanying drawings,—Figure 1 is a horizontal sectional view of my improved apparatus; Fig. 2 is a front view; and Fig. 3 is a similar view showing a modification.

My improved apparatus comprises the combination or association with a photographic objective of any suitable type of a plus system of lenses by which the area of the image is reduced to the desired size, the objective being of considerably greater diameter than the size of the desired image, so that the image is formed principally by the rays which correspond to those that give rise to normal or binocular human vision. After passing through the objective, the rays unite at the focal plane, forming a single image in the focal plane of the system. This image is binocular or third dimensional in aspect, because it is constituted largely, if not altogether, by rays from two different angles of the object photographed, such angles approximating the angles of sight between normal eyes in human vision. In order to intensify or increase this binocular effect, a ray intercepter, such as an opaque screen or disk, may be placed between the object to be photographed and the objective, and centrally of the latter, so as to completely intercept or cut out the central or monocular rays that would otherwise pass through the lens, thus permitting the resulting image to be formed wholly by the rays of light that pass through the lateral or peripheral zones of the objective. This screen or intercepter may extend entirely across the lens, or it may be in the form of a disk disposed centrally of the objective.

Referring to the drawings,—*a—b* indicate two compound achromatic lenses, such as are commonly employed in a photographic objective, said lenses being mounted in a suitable tubular support *c* in any suitable way.

*d* indicates the monocular ray intercepter, which, in the construction shown in Figs. 1 and 2, is in the form of a band extending centrally across the outer face of the lens *a* so as to lie between the objective and the object to be photographed, leaving two lateral portions of the lens exposed at opposite sides thereof. In the construction shown in Fig. 3, the intercepter is in the form of a disk *d'*, which may be of any suitable opaque material and may be secured to the lens *a* in any suitable way, such as by pasting it thereupon. In the latter construction the entire marginal portion of the lens *a* is exposed. As illustrated diagrammatically in Fig. 1, in which the arrow *e* indicates the object to be photographed, the axial rays are cut off, the effective rays being those which strike the side or marginal portions of the objective, as the case may be.

In connection with the lenses *a—b* I provide a plus system of lenses comprising one or more plano-convex compound lenses for reducing the image to the desired size. In the drawings I have shown three of such lenses, marked, respectively, *f*, *g*, *h*, mounted in cylinders *f'*, *g'*, *h'*, respectively. The cylinder *f'* is arranged to screw into the cylinder or tube *c*, and the cylinders *g'—h'* are similarly fitted together, so that they may be readily removed. The small arrow *i* at the left in Fig. 1 illustrates the image, the dotted lines representing the light rays by which it is formed. As clearly indicated by the diagram, this image is perfectly homogeneous and is composed only of the binocular rays coming from the object,—the refractive power of the plus lens system uniting the separate right and left bundles of rays and condensing them into the single perfect image. By thus combining a system of plus lenses with an objective of relatively large diameter as compared with the size of the image formed in the focal plane, the size of the image is greatly reduced relative to the size of the aperture of the objective so that the image formed contains a highly accentuated relief quality, whether used in ordinary photography or projected kinetographically, giving to the resulting picture a roundness not heretofore obtainable, and corresponding in its relief and spatial aspect to the sensation of actual binocular vision. If desirable, the objective may be constructed as a complete unit, the several parts being so arranged as to be non-separable, or the separate lenses may be made removable as illustrated in the drawings, or in any other suitable way.

That which I claim as my invention, and desire to secure by Letters Patent, is,—

An objective, comprising two compound achromatic lenses, one or more plano-convex compound lenses for reducing the image to the desired size, and a ray intercepter associated with one of said achromatic lenses.

HAGAR BOLTON BYRON.

Witnesses:
 JOHN L. JACKSON,
 MINNIE A. HUNTER.

Copies of this patent may be obtained for five cents each, by addressing the " Commissioner of Patents, Washington, D. C."